(12) United States Patent
Pedersen et al.

(10) Patent No.: US 10,657,291 B2
(45) Date of Patent: *May 19, 2020

(54) TECHNIQUES FOR PROTECTING SECURITY FEATURES OF INTEGRATED CIRCUITS

(71) Applicant: Altera Corporation, San Jose, CA (US)

(72) Inventors: Bruce Pedersen, Sunnyvale, CA (US); Ting Lu, Austin, TX (US); Brian Wong, Mountain View, CA (US); Alok Doshi, Milpitas, CA (US); Yun Sum Wong, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,528

(22) Filed: Sep. 24, 2018

(65) Prior Publication Data

US 2019/0026497 A1 Jan. 24, 2019

Related U.S. Application Data

(63) Continuation of application No. 15/061,622, filed on Mar. 4, 2016, now Pat. No. 10,095,889.

(51) Int. Cl.
*G06F 21/70* (2013.01)
*G09C 1/00* (2006.01)
(Continued)

(52) U.S. Cl.
CPC .............. *G06F 21/70* (2013.01); *G06F 1/26* (2013.01); *G06F 3/0679* (2013.01); *G06F 21/62* (2013.01);
(Continued)

(58) Field of Classification Search
CPC . G06F 3/0679; G06F 2206/1014; G06F 21/70
See application file for complete search history.

(56) References Cited

U.S. PATENT DOCUMENTS

| 5,452,355 | A | 9/1995 | Coli | |
| 6,690,193 | B1 * | 2/2004 | Heinzer | G11C 7/1045 326/37 |

(Continued)

FOREIGN PATENT DOCUMENTS

GB 2 331 821 6/1999

OTHER PUBLICATIONS

Korean Intellectual Property Office, International Search Report of the ISA for international application PCT/US2017/017507, dated May 19, 2017, pp. 1-3.

(Continued)

*Primary Examiner* — Thaddeus J Plecha
(74) *Attorney, Agent, or Firm* — Steven J. Cahill (57) ABSTRACT

An integrated circuit includes a control circuit and a one-time programmable circuit. The control circuit determines if the one-time programmable circuit is programmed in response to an attempt to access a mode of the integrated circuit after the integrated circuit powers up. The control circuit generates a signal to indicate to a user of the integrated circuit that the mode of the integrated circuit has been previously accessed if the control circuit determines that the one-time programmable circuit has been programmed to indicate a previous access to the mode of the integrated circuit.

20 Claims, 5 Drawing Sheets

(51) Int. Cl.
    *H04L 9/08*      (2006.01)
    *G06F 21/71*      (2013.01)
    *G06F 21/62*      (2013.01)
    *G06F 1/26*      (2006.01)
    *G06F 3/06*      (2006.01)
    *H04L 9/32*      (2006.01)

(52) U.S. Cl.
    CPC ............. *G06F 21/71* (2013.01); *G09C 1/00* (2013.01); *H04L 9/0866* (2013.01); *H04L 9/3278* (2013.01); *G06F 2206/1014* (2013.01)

(56) References Cited

U.S. PATENT DOCUMENTS

| | | | |
|---|---|---|---|
| 7,606,362 | B1 | 10/2009 | Streicher et al. |
| 8,885,819 | B2 | 11/2014 | Gotze et al. |
| 9,685,958 | B2 * | 6/2017 | Bhunia ............. G11C 17/16 |
| 10,095,889 | B2 * | 10/2018 | Pedersen ............. G06F 1/26 |
| 2008/0101146 | A1 | 5/2008 | Paak et al. |
| 2009/0180307 | A1 * | 7/2009 | Kurjanowicz ........ G11C 17/10 |
| | | | 365/96 |
| 2009/0296933 | A1 | 12/2009 | Akselrod et al. |
| 2010/0174848 | A1 | 7/2010 | Hana et al. |
| 2011/0141791 | A1 | 6/2011 | Ahmed |
| 2014/0137271 | A1 | 5/2014 | Hyde et al. |
| 2015/0082420 | A1 | 3/2015 | Love et al. |
| 2016/0055920 | A1 | 2/2016 | Lee |

OTHER PUBLICATIONS

Korean Intellectual Property Office, Written Opinion of the ISA for international application PCT/US2017/017507, dated May 19, 2017, pp. 1-8.

European Patent Office, extended European search report for European patent application 17760462.6, pp. 1-7.

* cited by examiner

TECHNIQUES FOR PROTECTING SECURITY FEATURES OF INTEGRATED CIRCUITS

CROSS REFERENCE TO RELATED APPLICATION

This patent application is a continuation of U.S. patent application Ser. No. 15/061,622, filed Mar. 4, 2016, which is incorporated by reference herein in its entirety.

FIELD OF THE DISCLOSURE

The present disclosure relates to electronic circuits and systems, and more particularly, to circuits and methods for protecting security features of integrated circuits.

BACKGROUND

A field programmable gate array (FPGA) is an integrated circuit that has programmable logic circuits and programmable routing circuits. The programmable logic and routing can be configured with a configuration bitstream that is loaded into the FPGA from an external source. An FPGA may also have a test mode that is used by the manufacturer of the FPGA to check that the FPGA is fully-functional before being sold, and also used to perform failure analysis on an FPGA returned from the field. Test mode often provides greater access and control over elements in the FPGA than the access and control provided to an ordinary user through the bitstream. An FPGA may contain a fuse that can be used to permanently disable test mode access or to prevent the programming or read-back of encryption keys.

BRIEF SUMMARY

According to some embodiments, an integrated circuit includes a control circuit and a one-time programmable circuit. The control circuit determines if the one-time programmable circuit is programmed in response to an attempt to access a mode of the integrated circuit after the integrated circuit powers up. The control circuit generates a signal to indicate to a user of the integrated circuit that the mode of the integrated circuit has been previously accessed if the control circuit determines that the one-time programmable circuit has been programmed to indicate a previous access to the mode of the integrated circuit.

Various objects, features, and advantages of the present invention will become apparent upon consideration of the following detailed description and the accompanying drawings.

DETAILED DESCRIPTION

Field programmable gate array (FPGA) integrated circuits (also referred to as devices) are often used in critical commercial, industrial, and military infrastructure; and therefore, they may be subject to attack by hostile adversaries. An attack may be intended to damage an FPGA device, to cause the device to fail prematurely due to life-time stress conditions, or to make a deployed device more susceptible to future attacks.

For example, the test mode of an FPGA device could be used to deliberately over-stress certain transistors in the FPGA device, making the transistors susceptible to premature negative bias temperature instability (NBTI) effects. These effects could be used to imprint static random access memory (RAM) or registers in the FPGA device, causing them to power-up to a known state that is favorable to an attacker.

Another form of an attack involves intercepting secrets that are stored in the FPGA, such as encryption keys. These secrets stored in the FPGA device may be protected by unique values in the FPGA device, such as unique values created by physically unclonable functions (PUFs). These values may need to be known by the end user of the FPGA before deploying the device, but the end user would want to prevent an attacker from extracting the secret before or after the FPGA is deployed, because an attacker might intercept the FPGA anywhere along its supply chain. Other forms of tampering may have less malicious motivation, but still need to be protected against. For example, the reselling of previously used (and thus partially stressed and worn-out) FPGA devices as new and fresh FPGA devices would also have the effect of causing the FPGA devices to unexpectedly fail prematurely in their second application.

According to some embodiments disclosed herein, a security feature of an integrated circuit (IC) is protected by a one-time programmable circuit. A control circuit may allow a user access to the security feature of the IC based on the state of the one-time programmable circuit. The control circuit may prevent a user from accessing the security feature of the IC based on the state of the one-time programmable circuit. The security feature may be, for example, an encryption key, a physically unclonable function (PUF), a secure storage area of the IC, a test mode of the IC, a configuration mode of an FPGA, or a user mode of an IC. The security feature may also be referred to as a secure feature.

In some embodiments, the control circuit may allow a user to access the security feature of the IC only until the next power on reset of the IC that occurs after the one-time programmable circuit has been programmed by setting a security feature access register. After the next power on reset of the IC, the IC clears the security feature access register to a cleared state. In response to the security feature access register being in a cleared state, the control circuit prevents a user from accessing the security feature of the IC. The security feature access register may, for example, remain in a cleared state indefinitely, or the security feature access register may be set again by another one-time programmable circuit. FIGS. 1-4 illustrate some examples of these embodiments.

Figure 1:
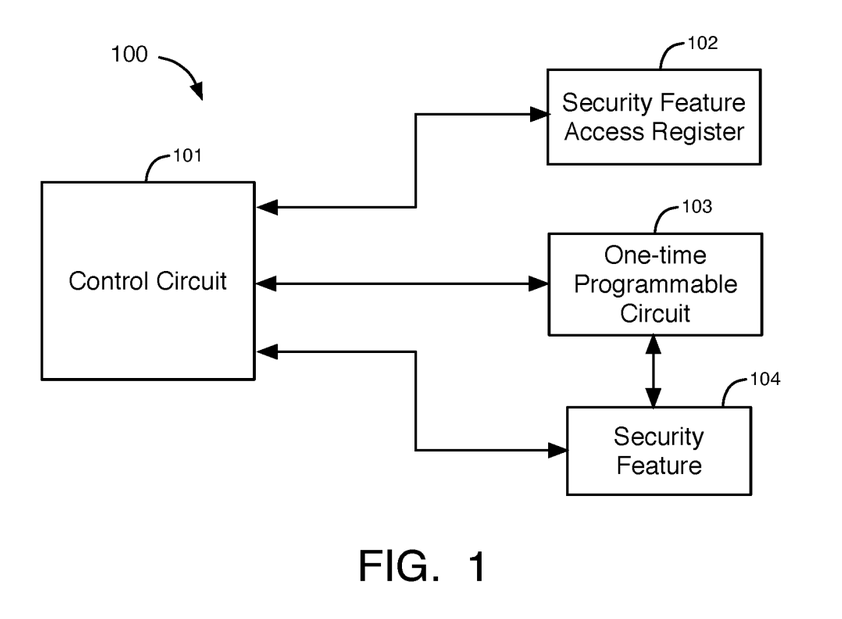
FIG. 1 illustrates an example of a security feature access system, according to an embodiment.

FIG. 1 illustrates an example of a security feature access system 100, according to an embodiment. The security feature access system 100 of Figure (FIG. 1 includes a control circuit 101, a security feature access register circuit 102, a one-time programmable circuit 103, and a security feature 104. Security feature access system 100, including circuits 101-104, may be located entirely within an integrated circuit (IC). The IC may be, for example, an FPGA, a programmable logic device (PLD), a programmable logic array (PLA), a processor, a memory device, an analog device, or any other type of IC. Control circuit 101 may be, for example, a state machine, a processor circuit, a portion of a processor circuit, programmable logic circuits programmed to function as a controller, or another type of control circuit.

System 100 supports two-way communication between control circuit 101 and each of security feature access register 102, one-time programmable circuit 103, and security feature 104, as shown by arrows in FIG. 1. System 100 may also support two-way communication between one-time programmable circuit 103 and security feature 104 as shown in FIG. 1. Security feature access register 102 is a volatile storage circuit that may include, for example, one or more flip-flop circuits.

Security feature 104 may be, for example, a secure storage area of an IC, a test mode of an IC, a configuration mode of a programmable IC, a user mode of an IC, the programmable logic circuits of a programmable logic IC, an encryption key, a physically unclonable function (PUF), to name a few examples. A PUF is on-die circuitry that uses non-reproducible manufacturing variations of the IC die to produce a function that is a unique and unclonable function in every IC die. A PUF can be used to generate a challenge-response pair. The input to a PUF is the challenge, and the output of the PUF is the response. The challenge and the response may each be, for example, hundreds or thousands of bits. PUFs can be used to protect encryption keys. A secret PUF can be used to hide an encryption key, for example, by XORing the encryption key with the PUF response to generate an output key. The original encryption key can be extracted from the output key by XORing the output key with the PUF response. A PUF can also be used to generate an encryption key.

Security feature 104 may be any type of PUF. Two examples of PUFs are an arbiter PUF and a static-RAM PUF. An arbiter PUF is a PUF that uses the difference between the delays of two different signal paths in an IC die that is caused by manufacturing variations of an individual IC die. A static-RAM PUF is a PUF that is based on individual memory cells of an SRAM circuit in an IC powering up to random states.

A PUF may be a soft PUF or a hard PUF. Hard PUFs are implemented directly into the silicon of an IC. Soft PUFs are implemented by configuring programmable resources in an IC, such as lookup tables, registers, and memories. Both static RAM and arbiter PUFs can be implemented as hard PUFs or as soft PUFs using programmable resources in a programmable IC.

In an embodiment, security feature 104 may be, for example, the combination of a soft PUF implemented by programmable resources in a programmable IC and a configuration mode of the programmable IC. The combination of the soft PUF and the configuration mode as the security feature 104 protects against attacks on the soft PUF. In this embodiment, the state of one-time programmable circuit 103 indicates if the IC has ever been configured before a user first received the IC. If the one-time programmable circuit 103 indicates that the IC has been configured before by another user, it is possible that an attacker may have intercepted the IC, programmed the soft PUF into the programmable resources, and read the PUF response. If the one-time programmable circuit 103 indicates that the IC has not been configured before by another user, the user can be confident that the user has gained sole knowledge of the PUF response. The user can then use the PUF response to create or protect an encryption key that prevents future configurations of the IC by anyone who does not correctly enter the encryption key. For example, a user may program the one-time programmable circuit 103 to cause the IC to require the correct entry of a PUF protected or created encryption key before the IC enters configuration mode and user mode. This embodiment prevents an attacker from subsequently gaining access to the PUF response.

One-time programmable circuit 103 may include, for example, one or more non-volatile, one-time programmable fuses (also referred to herein simply as fuses) and/or one or more non-volatile, one-time programmable antifuses (also referred to herein simply as antifuses). Each one-time programmable fuse has a conductive path that conducts current before the fuse is blown. After the fuse is blown (i.e., programmed), the conductive path is broken, and the fuse conducts little or no current through the previously conductive path. Each fuse can be programmed/blown only one time. A one-time programmable fuse may include a resistor that burns out when an over current, over load, or mismatched load connect event occurs. Each one-time programmable antifuse initially has a high resistance path that conducts little or no current until the antifuse is programmed. After the antifuse is programmed, the antifuse has a low resistance conductive path that conducts significantly more current. Each antifuse can be programmed only one time.

Figure 2:
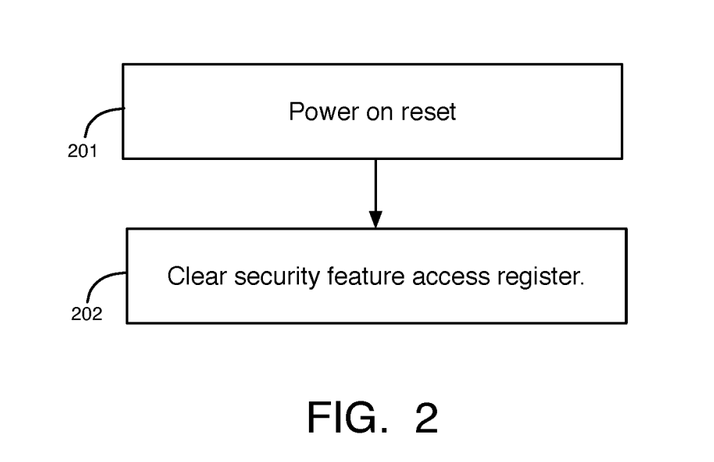
FIG. 2 is a flow chart that shows examples of operations that may be performed to clear a security feature access register, according to an embodiment.

FIG. 2 is a flow chart that shows examples of operations that may be performed to clear a security feature access register, according to an embodiment. In the embodiment of FIG. 2, the security feature access register 102 is cleared after a power on reset operation of the integrated circuit (IC) that contains the security feature access register 102 and the security feature 104. In operation 201, the IC performs a power on reset operation. A power on reset operation may occur each time the IC receives power (i.e., is powered up) after being powered off. In operation 202, control circuit 101 clears the security feature access register 102. Control circuit 101 may clear the security feature access register 102 by causing the bit (or bits) stored in the security feature access register 102 to have a predefined clear value. The predefined clear value is a known value that may be, e.g., a logic low state, a logic high state, or a predefined set of bit values if register 102 stores multiple bits.

Figure 3:
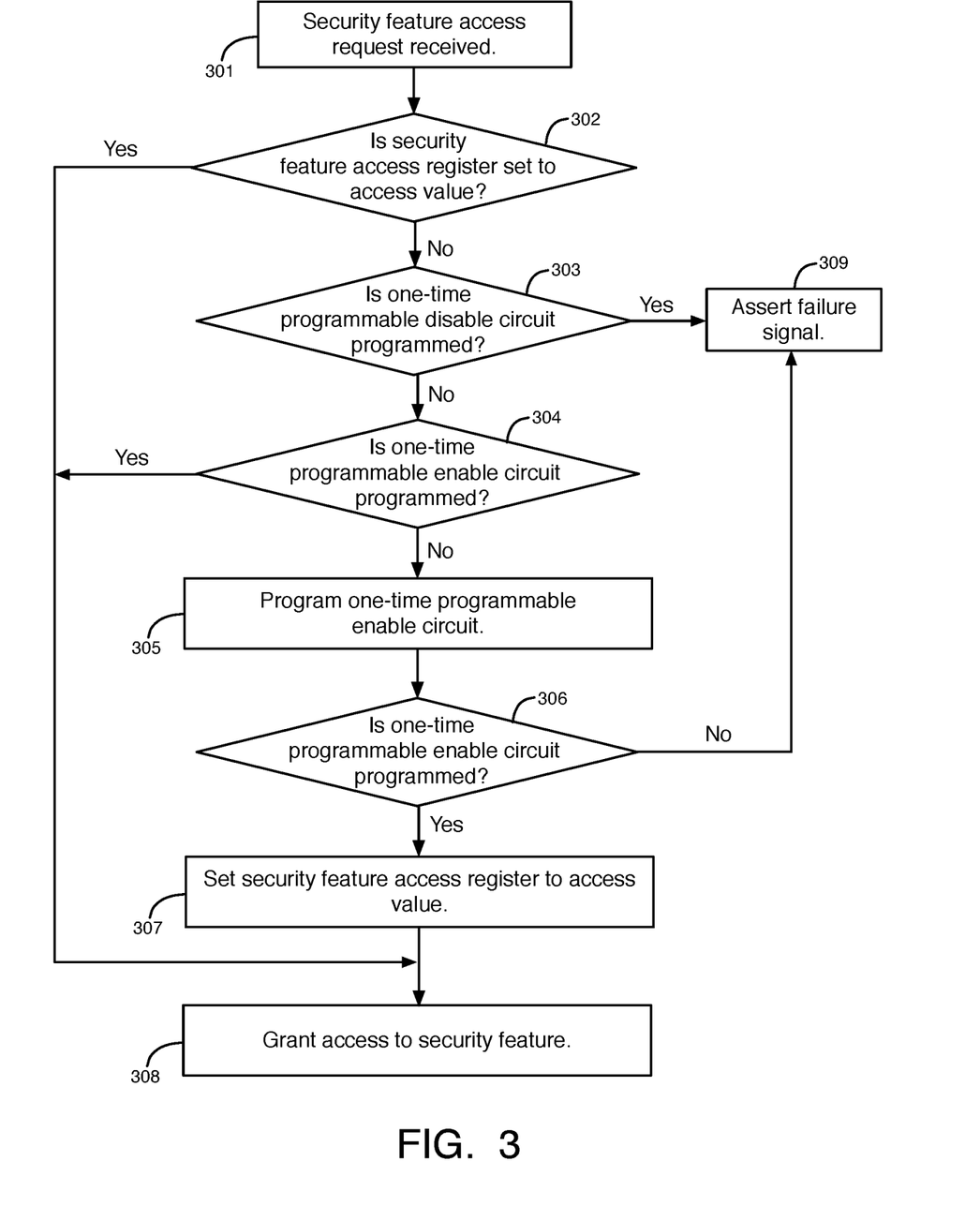
FIG. 3 is a flow chart that illustrates examples of operations that may be performed to determine if an integrated circuit (IC) will allow a user to access a security feature, according to an embodiment.

FIG. 3 is a flow chart that illustrates examples of operations that may be performed to determine if an IC will allow a user to access a security feature, according to an embodiment. In the embodiment of FIG. 3, one-time programmable circuit 103 includes a one-time programmable disable circuit and a one-time programmable enable circuit. The one-time programmable disable and enable circuits of FIG. 3 can be fuses, antifuses, or any combination of one or more fuses and one or more antifuses. In the embodiment of FIG. 3, control circuit 101 allows a user of the IC to access the security feature 104 only if the one-time programmable disable circuit is not programmed, and the one-time programmable enable circuit is programmed. If both the one-time programmable disable and enable circuits are not programmed, control circuit 101 may optionally cause the one-time programmable enable circuit to be programmed automatically. The one-time programmable enable circuit may be used as a future indicator that the security feature 104 has been previously accessed. Granting access to security feature 104 may include setting the security feature access register 102 to a predefined access value, which will allow a user to access security feature 104 at least until the next power on reset event in the IC.

In operation 301, control circuit 101 receives a request to access the security feature 104. The request may be generated in response to input from a user of the IC requesting access to security feature 104. In operation 302, control circuit 101 determines if the bit (or bits) stored in the security feature access register 102 is set to the access value. The access value may be, e.g., the opposite logic state as the predefined clear value. If the bit (or bits) stored in the security feature access register 102 is set to the access value at operation 302, control circuit 101 grants the user access to security feature 104 in operation 308 as shown in FIG. 3.

If the bit (or bits) stored in the security feature access register 102 is not set to the access value at operation 302, control circuit 101 proceeds to operation 303. In operation 303, control circuit 101 determines if the one-time programmable disable circuit is programmed. If the one-time programmable disable circuit is programmed at operation 303, control circuit 101 asserts a failure signal in operation 309, and control circuit 101 prevents a user of the IC from accessing the security feature 104. A user interface may provide a message to the user in response to the failure signal generated in operation 309 to indicate that a failure has occurred and/or that the security feature 104 cannot be accessed. The control circuit 101 may cause the one-time programmable disable circuit to be programmed to prevent a user from accessing the security feature 104, for example, in response to user input or in response to a user accessing the security feature 104.

A one-time programmable circuit may prevent a user from accessing a security feature, for example, by physically blocking signal access to the security feature when the one-time programmable circuit is programmed. Signal access to security feature 104 may, for example, be routed through one-time programmable circuit 103, e.g., via a two-way communication path between circuits 103 and 104. When the one-time programmable disable circuit in circuit 103 is programmed, the output of the one-time programmable disable circuit may, for example, cause one or more logic gate circuits to block any signal access to security feature 104.

As another example, all accesses to security feature 104 may be routed through control circuit 101. In this example, control circuit 101 may prevent access to security feature 104 in response to detecting that the one-time programmable disable circuit is programmed. After the one-time programmable disable circuit is programmed, control circuit 101 blocks all accesses by a user of the IC to security feature 104.

If the one-time programmable disable circuit is not programmed at operation 303, control circuit 101 proceeds to operation 304. In operation 304, control circuit 101 determines if the one-time programmable enable circuit is programmed. If the one-time programmable enable circuit is programmed at operation 304, control circuit 101 grants the user access to security feature 104 in operation 308 as shown in FIG. 3. Control circuit 101 may also optionally indicate to the user that the security feature 104 has been previously accessed. If the one-time programmable enable circuit is not programmed at operation 304, control circuit 101 causes the one-time programmable enable circuit to be programmed in operation 305.

In operation 306, control circuit 101 again determines if the one-time programmable enable circuit is programmed. If control circuit 101 determines that the one-time programmable enable circuit is not programmed at operation 306, control circuit 101 asserts the failure signal in operation 309 as shown in FIG. 3 and prevents the user from accessing the security feature 104. If control circuit 101 determines that the one-time programmable enable circuit is programmed at operation 306, control circuit 101 sets the security feature access register 102 to the access value in operation 307. Control circuit 101 then grants the user access to the security feature 104 in operation 308 as shown in FIG. 3. Control circuit 101 allows the user to access the security feature 104 additional times by implementing additional iterations of operations 301-302 and 308 until the next power on reset of the IC. After the next power on reset of the IC, the security feature access register 102 is cleared to the clear value as disclosed herein with respect to FIG. 2.

According to some embodiments of the present invention, security in an IC is improved by disabling access to one or more security features of the IC, such as test mode, configuration of a programmable IC, user mode, or access to certain security areas, such as encryption keys or the output of hard or soft PUF circuitry, before or after one or more non-volatile, one-time programmable circuits are programmed. Control circuit 101 may detect if the one or more one-time programmable circuits have been previously programmed to deny or grant access to the security feature.

As discussed above, some previously known integrated circuits (ICs) have a test disable bit that can be set to disable access to a test mode. However, many manufacturers are unwilling to set this test disable bit for all customers, because doing so would prevent the failure analysis of any IC returned from the field. On the other hand, with these previously known ICs, if the manufacturer selectively sets the test disable bit for some customers, but sold some ICs without the test disable bit being set, users who received an IC that did not have the test disable bit set would be able to enter test mode, set the test disable bit, and subsequently reintroduce the IC into the supply chain. Users who care about the security of their ICs would not be able to distinguish these tampered ICs from ICs that were not tampered with. Manufacturers may have similar problems in controlling access to other security features of their ICs.

According to an exemplary embodiment, control circuit 101 of FIG. 1 prevents undetected access to a test mode of an IC. In this exemplary embodiment, access to the test mode by a user of the IC is controlled based on the states of two one-time programmable enable circuits and two one-time programmable disable circuits. This embodiment may, for example, be implemented by two iterations of the operations shown in FIG. 3. In this embodiment, access to the features of the test mode by a user of the IC is prevented until the first one-time programmable enable circuit is programmed, e.g., in the first iteration of operation 305. Access to the test mode can be temporarily disabled by programming the first one-time programmable disable circuit. Control circuit 101 prevents the user from accessing test mode if the first or second one-time programmable disable circuit is programmed, as disclosed with respect to operations 303 and 309. Access to the test mode of the IC by a user can then be re-enabled by programming the second one-time programmable enable circuit, e.g., in the second iteration of operation 305 after a power on reset of the IC. Access to the test mode of the IC by a user can then be permanently prevented by programming the second one-time programmable disable circuit. If the second one-time programmable enable circuit is not programmed when the second one-time programmable disable circuit is programmed, the second one-time programmable enable circuit cannot be programmed after the second one-time programmable disable circuit is programmed.

The original states of the one-time programmable circuits (as of the time the IC is powered-on) are made accessible to designs implemented by the IC (e.g., designs programmed into an FPGA) and to users of the IC (e.g., through JTAG ports). The manufacturer responsible for functionality tests of the IC is then able to detect if an IC has been intercepted and if the test mode of the IC has been accessed anywhere along the prior supply chain by checking if the first one-time programmable enable circuit was previously programmed by someone other than the functionality tester. The manufacturer may then respond appropriately (e.g., by marking or destroying the IC). After the IC has been tested, the manufacturer programs the first one-time programmable disable circuit and reintroduces the IC into the supply or sales chain. When a user receives the IC from the supply chain, the user (or the user's design that is programmed into the FPGA) can check that the first one-time programmable disable circuit is programmed, and that the second one-time programmable enable circuit is not programmed. If the second one-time programmable enable circuit has been programmed, the user is then able to detect that the test mode of the IC has been accessed somewhere along the supply chain after having left the functionality testing facility of the manufacturer. The user can then respond appropriately (e.g., return the device to the manufacturer). If the user so chooses, and does not want the ability to return the IC to the manufacturer for possible future failure analysis, the user can program the second one-time programmable disable circuit to permanently disable the test mode of the IC.

Other security-related features can be implemented in a similar manner. For example, separate PUF access enable and disable one-time programmable circuits may allow access to a response generated by a PUF in an IC in response to a challenge input. The PUF access enable and disable one-time programmable circuits control secure access to an encryption key generated from a PUF response. As another example, separate configuration enable and disable one-time programmable circuits for a programmable IC may allow access to user configuration of the IC. The configuration enable/disable one-time programmable circuits ensure that a user of the programmable IC is receiving a new IC, as opposed to a "grey market" IC that had been previously used.

Figure 4:
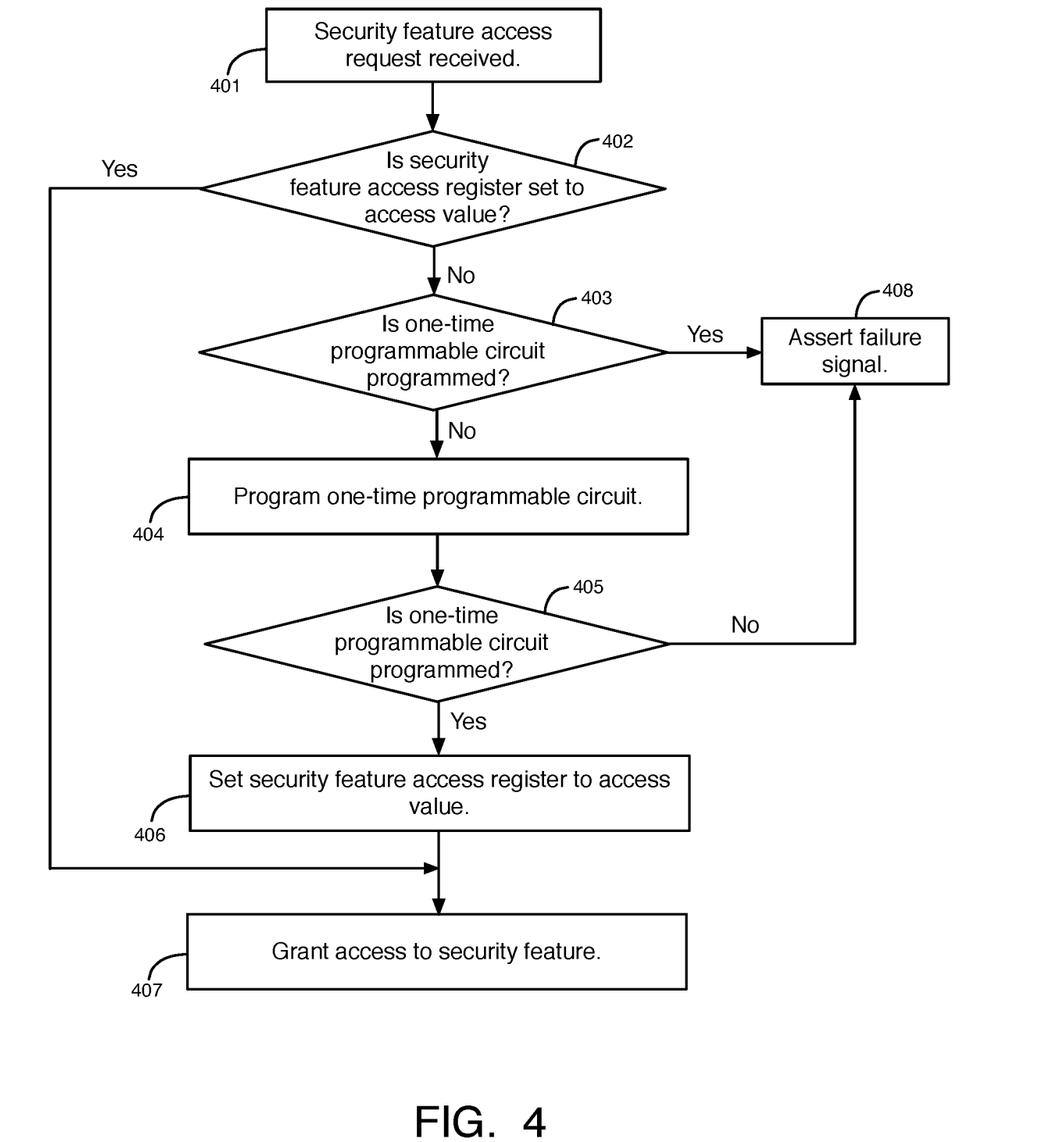
FIG. 4 is a flow chart that illustrates examples of operations that may be performed to determine if an IC will allow a user to access a security feature, according to another embodiment.

FIG. 4 is a flow chart that illustrates examples of operations that may be performed to determine if an IC will allow a user to access a security feature, according to another embodiment. In the embodiment of FIG. 4, one-time programmable circuit 103 can include one or more fuses, one or more antifuses, or a combination of one or more fuses and one or more antifuses. In the embodiment of FIG. 4, granting access to security feature 104 includes setting the security feature access register 102 to a predefined access value to allow a user to access security feature 104 at least until the next power on reset event in the IC. The one-time programmable circuit 103 being programmed is an indicator that the security feature 104 has been previously accessed.

In operation 401, control circuit 101 receives a request to access the security feature 104. The request may be generated in response to input from a user requesting access to security feature 104. In operation 402, control circuit 101 determines if the bit (or bits) stored in the security feature access register 102 is set to the access value. If the bit (or bits) stored in the security feature access register 102 is set to the access value at operation 402, control circuit 101 grants the user access to security feature 104 in operation 407 as shown in FIG. 4.

If the bit (or bits) stored in the security feature access register 102 is not set to the access value at operation 402, control circuit 101 proceeds to operation 403. In operation 403, control circuit 101 determines if the one-time programmable circuit 103 is programmed. If the one-time programmable circuit 103 is programmed at operation 403, control circuit 101 asserts a failure signal in operation 408 and prevents the user from accessing the security feature 104. A user interface may provide a message to the user in response to the failure signal to indicate that a failure has occurred and/or that the security feature 104 cannot be accessed. Control circuit 101 may cause the one-time programmable circuit 103 to be programmed to prevent a user from accessing the security feature 104 after the next power on reset of the IC, for example, in response to a user accessing the security feature 104.

If the one-time programmable circuit 103 is not programmed at operation 403, control circuit 101 proceeds to operation 404. In operation 404, control circuit 101 causes the one-time programmable circuit 103 to be programmed. In operation 405, control circuit 101 again determines if the one-time programmable circuit 103 is programmed. If control circuit 101 determines that the one-time programmable circuit 103 is not programmed at operation 405, control circuit 101 asserts the failure signal in operation 408 as shown in FIG. 4 and prevents the user from accessing the security feature 104.

If control circuit 101 determines that the one-time programmable circuit 103 is programmed at operation 405, control circuit 101 sets the security feature access register 102 to the access value in operation 406. Control circuit 101 then grants the user access to the security feature 104 in operation 407 as shown in FIG. 4. Control circuit 101 grants the user additional accesses to the security feature 104 by implementing additional iterations of operations 401-402 and 407 until the next power on reset of the IC. After the next power on reset of the IC, the security feature access register 102 is cleared to the clear value as disclosed herein with respect to FIG. 2, and then the control circuit 101 does not allow any user of the IC any additional accesses to the security feature 104.

Figure 5:
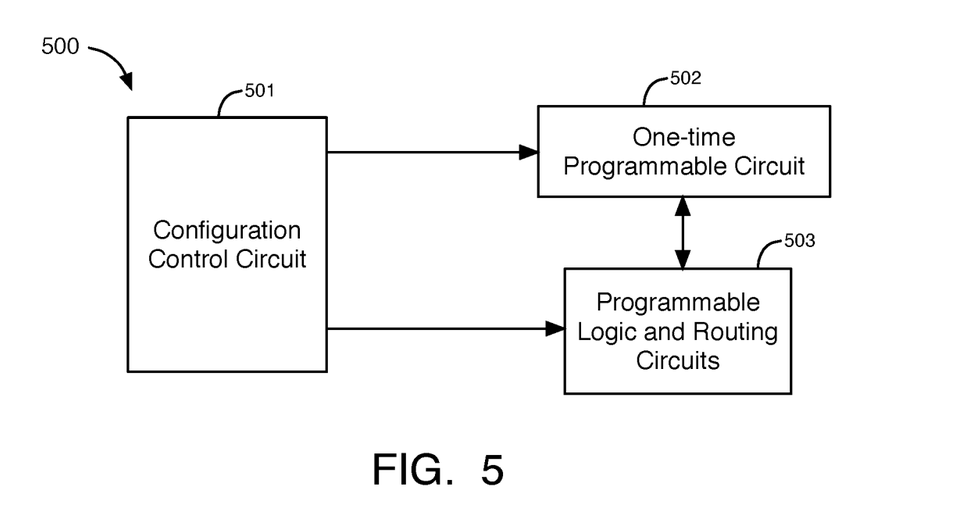
FIG. 5 illustrates an example of another security feature access system, according to a further embodiment.

FIG. 5 illustrates an example of a security feature access system 500, according to another embodiment. The security feature access system 500 of FIG. 5 includes a configuration control circuit 501, a one-time programmable circuit 502, and programmable logic and routing circuits 503. Security feature access system 500, including circuits 501-503, may be located entirely within a programmable integrated circuit (IC). The IC may be, for example, an FPGA, a PLD, a PLA, or another type of programmable IC. Programmable logic and routing circuits 503 are programmable resources of a programmable IC. Configuration control circuit 501 may be, for example, a state machine, a processor circuit, a portion of a processor circuit, or another type of control circuit. System 500 supports two-way communication between control circuit 501 and each of one-time programmable circuit 502 and programmable logic and routing circuits 503, as shown by arrows in FIG. 5. One-time programmable circuit 502 can include one or more fuses, one or more antifuses, or a combination of one or more fuses and one or more antifuses. The programmable logic and routing circuits 503 may include an array of programmable logic circuits and programmable routing circuits (e.g., multiplexers) that controls a network of routing conductors to interconnect the programmable logic circuits.

Figure 6:
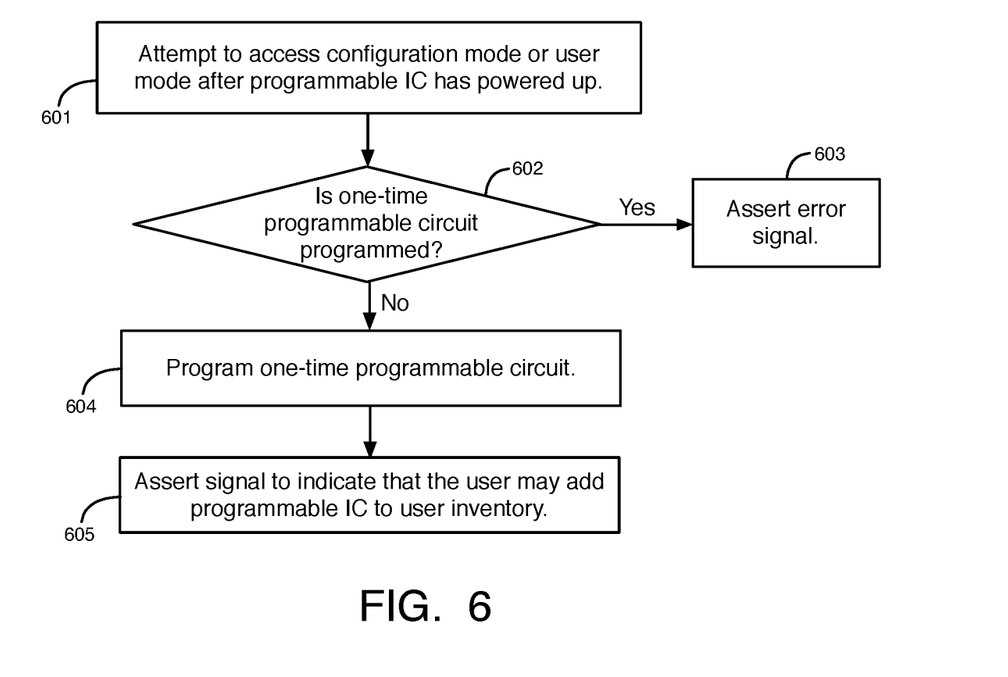
FIG. 6 is a flow chart that illustrates examples of operations for determining if a programmable integrated circuit (IC) has been previously configured, according to an embodiment.
Figure 7:
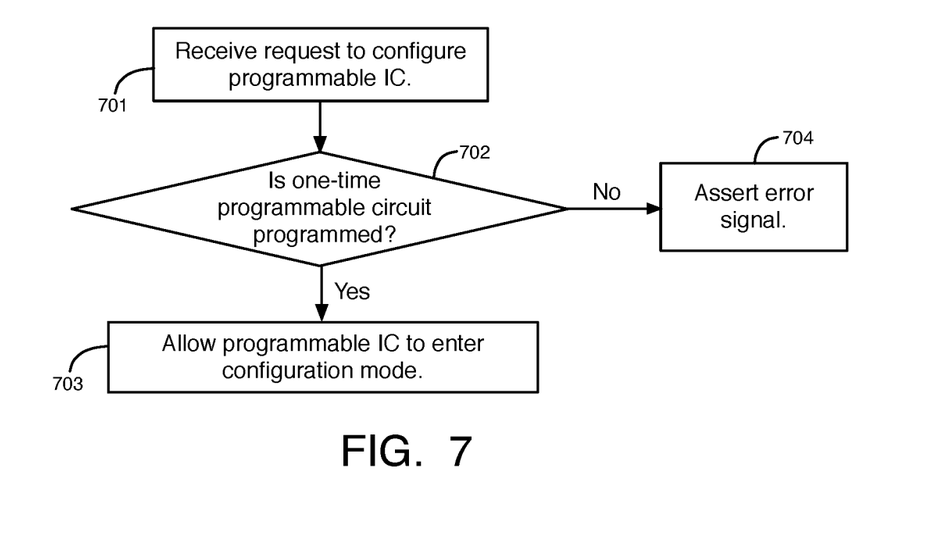
FIG. 7 is a flow chart that illustrates examples of operations that determine if a programmable integrated circuit (IC) has been previously programmed, according to another embodiment.
Figure 8:
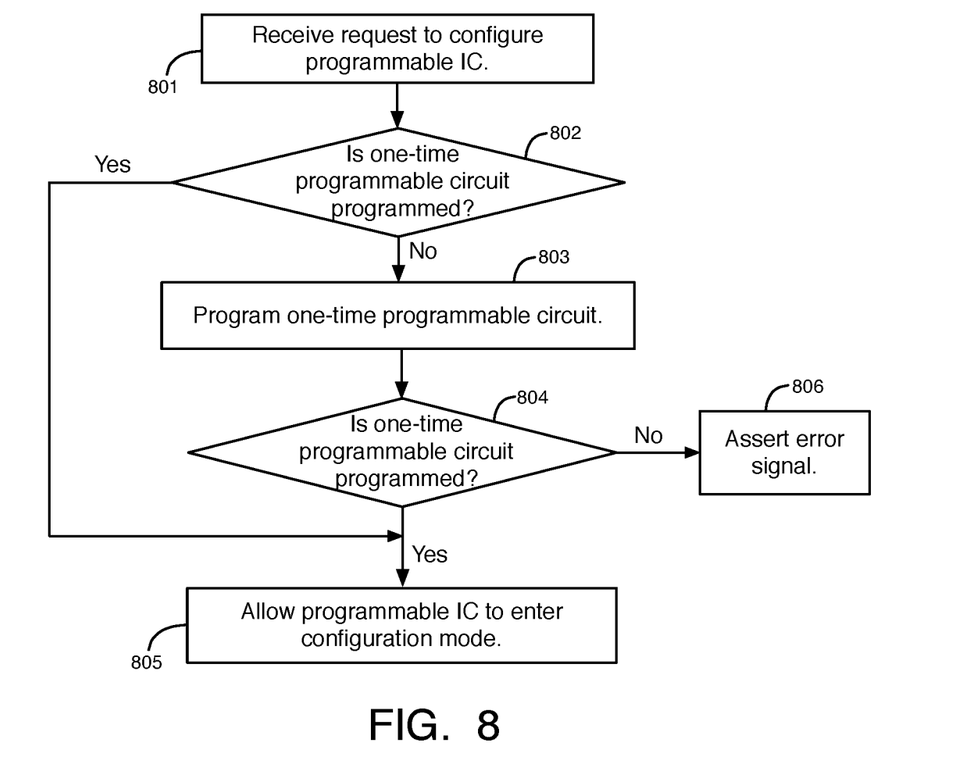
FIG. 8 is a flow chart that illustrates other examples of operations that determine if a programmable integrated circuit (IC) has been previously programmed, according to a further embodiment.

In the embodiment of FIG. 5, the security feature protected by the one-time programmable circuit 502 is a configuration mode of the programmable IC, and thus access to the programmable logic and programmable routing circuits 503 of the IC. One-time programmable circuit 502 is used to control access to the configuration mode of the programmable IC. During the configuration mode, programmable logic and programmable routing circuits 503 in the programmable IC are configured with a configuration bitstream that is loaded into the IC from an external source. The programmable IC is configured with the configuration bitstream during the configuration mode to implement a user design for the IC. Configuration control circuit 501 controls access to the configuration mode of the IC. Thus, the configuration control circuit 501 also controls user access to the programmable logic and programmable routing circuits 503. Configuration control circuit 501 may allow a user to cause the programmable IC to enter configuration mode to configure the programmable IC if the one-time programmable circuit 502 is programmed. The control circuit 501 may prevent the programmable IC from entering configuration mode if the one-time programmable circuit 502 is not programmed. FIGS. 6-8 illustrate operations that may be performed using system 500 according to various embodiments.

FIG. 6 is a flow chart that illustrates examples of operations for determining if a programmable integrated circuit (IC) has been previously configured, according to an embodiment. FIG. 6 shows the supply chain flow when a user first receives an ostensibly new programmable IC from a distributer. The operations of FIG. 6 allow a user to determine if the programmable resources of the programmable IC have ever been configured before by checking the state of the one-time programmable circuit 502. The programmable resources of the programmable IC may be configured in a configuration mode and then subsequently utilized in a user mode. If the programmable IC has already been configured, the user may return the IC to the manufacturer and mark the IC as used, or discard the IC. If the IC has not been configured previously, the user may optionally program the one-time programmable circuit 502 and proceed with configuring the IC. The one-time programmable circuit 502 is not programmed when the manufacturer powers up the IC into a test mode. The programmable IC as discussed with respect to FIGS. 6-8 may be, for example, an FPGA, a PLD, a PLA, or even an application specific integrated circuit (ASIC) that has some programmable features.

In FIGS. 6-8, the security feature may, as an example, include the combination of a soft PUF implemented by the programmable resources and a configuration or user mode of the programmable IC. The combination of the soft PUF and the configuration/user mode as the security feature protects against attacks on the soft PUF, as described above. The state of one-time programmable circuit 502 indicates if the IC has ever been configured before a user first receives the IC.

After a user receives a programmable IC from a distributer, the user powers up the programmable IC. In operation 601, an attempt is made to access configuration mode or user mode after the programmable IC has powered up, as shown in FIG. 6. The attempt to access the configuration mode or user mode in operation 601 may occur in response to user input, or the programmable IC may automatically attempt to enter configuration mode or user mode after the IC powers up. In operation 602, the configuration control circuit 501 determines if the one-time programmable circuit 502 (e.g., that has a fuse and/or an antifuse) is programmed in response to the attempt in operation 601. If the configuration control circuit 501 determines that the one-time programmable circuit 502 is programmed in operation 602, then the control circuit 501 may assert an error signal in operation 603. A user interface may indicate to the user that the programmable IC has already been configured in response to the error signal that is asserted in operation 603. The user may then optionally decide to return the programmable IC, discard the programmable IC, or continue with configuring the programmable IC.

If the configuration control circuit 501 determines that the one-time programmable circuit 502 is not programmed in operation 602, the user of the IC may optionally decide to program circuit 502 in operation 604. If the user decides to program circuit 502 after operation 602, the user may enter input into a user interface, and then in response to the user input, a control signal is sent to the control circuit 501. In response to receiving this control signal, control circuit 501 causes the one-time programmable circuit 502 to be programmed (e.g., blow a fuse) in operation 604. Control circuit 501 then proceeds to operation 605. In operation 605, control circuit 501 asserts a signal to indicate that the user may add the programmable IC to the user's inventory. The user interface may display a message to the user in response to the signal asserted in operation 605. The message may indicate that the user can add the programmable IC to the user's inventory.

FIG. 7 is a flow chart that illustrates operations that determine if a programmable integrated circuit (IC) has been previously programmed, according to an embodiment. Control circuit 501 checks if the programmable resources of the programmable IC have ever been previously configured by a user whenever an attempt is made to configure the programmable IC. The programmable IC cannot be configured until the one-time programmable circuit 502 is programmed. Therefore, the one-time programmable circuit 502 being in a programmed state indicates that the programmable IC has been previously configured. The operations of FIG. 7 may occur after operation 604 of FIG. 6. In the embodiments of FIGS. 6-7, one-time programmable circuit 502 may include one or more fuses, one or more antifuses, or a combination of one or more fuses and one or more antifuses.

In operation 701, the programmable IC receives a request from the user to configure the programmable IC and/or to enter the configuration mode. The request is routed to the configuration control circuit 501. In operation 702, the configuration control circuit 501 determines if the one-time programmable circuit 502 is programmed in response to receiving the request in operation 701. If the configuration control circuit 501 determines that the one-time programmable circuit 502 is not programmed in operation 702, then the control circuit 501 asserts an error signal in operation 704. The error signal generated in operation 704 indicates that circuit 502 is not programmed.

In response to the error signal generated in operation 704, a user interface may indicate to the user that circuit 502 is not programmed and that circuit 502 must be programmed in order to proceed to the configuration mode of the IC. The user interface may display to the user an option to program circuit 502 in response to the error signal generated in operation 704. If the user chooses the option to program circuit 502, control circuit 501 causes circuit 502 to be programmed, and then circuit 501 repeats operation 702. If the user does not choose the option to program circuit 502, control circuit 501 may prevent the programmable IC from entering configuration mode and user mode. The programmable IC can only be configured with a user's design in the configuration mode. Therefore, preventing the programmable IC from entering the configuration mode prevents a user from configuring the programmable IC.

Alternatively, control circuit 501 may automatically cause one-time programmable circuit 502 to be programmed in response to determining that circuit 502 is not programmed in operation 702. Control circuit 501 then repeats operation 702 to confirm that one-time programmable circuit 502 is programmed.

If the configuration control circuit 501 determines that the one-time programmable circuit 502 is programmed in operation 702, then the control circuit 501 proceeds to operation 703. In operation 703, control circuit 501 allows the programmable IC to enter configuration mode. During configuration mode, the programmable IC is configured to implement the user's design. Configuration control circuit 501 may also control the configuration of the programmable IC during or after operation 703.

After the programmable IC has been configured in the configuration mode, the programmable IC can enter a user mode during which the user's design that has been configured into the IC is used for its intended purpose. In an embodiment, the IC does not allow the user to enter user mode until the IC has been configured with a user design in the configuration mode. Thus, in this embodiment, the state of the one-time programmable circuit 502 also indicates whether the IC has ever entered the user mode.

FIG. 8 is a flow chart that illustrates examples of operations that determine if a programmable integrated circuit (IC) has been previously configured, according to an embodiment. Control circuit 501 checks if the one-time programmable circuit 502 is programmed when an attempt is made to configure the programmable IC. If the one-time programmable circuit 502 is not programmed, then control circuit 501 automatically programs circuit 502. The programmable IC cannot be configured until the one-time programmable circuit 502 is programmed. Therefore, the one-time programmable circuit 502 being in a programmed state indicates that the programmable IC has been previously configured. The operations of FIG. 8 may occur after operation 604 of FIG. 6. In the embodiment of FIG. 8, one-time programmable circuit 502 may include one or more fuses, one or more antifuses, or a combination of one or more fuses and one or more antifuses.

Referring to FIG. 8, the programmable IC receives a request from the user to configure the programmable IC in operation 801. The request is routed to the configuration control circuit 501. In operation 802, the configuration control circuit 501 determines if the one-time programmable circuit 502 is programmed in response to receiving the request in operation 801. If the configuration control circuit 501 determines that the one-time programmable circuit 502 is programmed in operation 802, then the control circuit 501 allows the programmable IC to enter configuration mode in operation 805. During configuration mode, the programmable IC is configured to implement the user's design. Configuration control circuit 501 may also control the configuration of the programmable IC in configuration mode during or after operation 805.

If the configuration control circuit 501 determines that the one-time programmable circuit 502 is not programmed in operation 802, then the control circuit 501 proceeds to operation 803. In operation 803, control circuit 501 causes the one-time programmable circuit 502 to be programmed. The control circuit 501 then proceeds to operation 804. In operation 804, the control circuit 501 determines if the one-time programmable circuit 502 is programmed. If the control circuit 501 determines that the one-time programmable circuit 502 is programmed in operation 804, then the control circuit 501 allows the programmable IC to enter configuration mode in operation 805.

If the control circuit 501 determines that the one-time programmable circuit 502 is not programmed in operation 804, then the control circuit 501 asserts an error signal in operation 806. In response to the error signal asserted in operation 806, a user interface may indicate to the user that an error has occurred in attempting to program the one-time programmable circuit 502. The control circuit 501 may then prevent the programmable IC from entering configuration mode and user mode.

The methods and apparatuses described herein may be incorporated into any suitable electronic device or system of electronic devices. For example, the methods and apparatuses may be incorporated into numerous types of integrated circuits, such as programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), microprocessors, and graphics processing units (GPUs).

The integrated circuits described herein may be part of a data processing system that includes one or more of the following components; a processor; memory; input/output circuitry; and peripheral devices. The integrated circuits can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or in a different order, or described operations may be distributed in a system that allows the occurrence of the processing operations at various intervals associated with the processing.

The foregoing description of the exemplary embodiments of the present invention is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A method for controlling access to an integrated circuit, the method comprising:

attempting to access a mode of the integrated circuit after the integrated circuit powers up;

determining if a one-time programmable circuit is programmed in response to the attempt to access the mode using a control circuit, wherein the integrated circuit comprises the control circuit and the one-time programmable circuit;

generating a signal to indicate to a user of the integrated circuit that the mode has been previously accessed if the control circuit determines that the one-time programmable circuit has been programmed to indicate a previous access to the mode; and preventing the integrated circuit from entering the mode if the user chooses not to program the one-time programmable circuit.

2. The method of claim 1 further comprising:

causing the one-time programmable circuit to be programmed if the control circuit determines that the one-time programmable circuit has not been programmed in response to the attempt to access the mode.

3. The method of claim 1, wherein the mode of the integrated circuit is one of a configuration mode of the integrated circuit, a test mode of the integrated circuit, or a user mode of the integrated circuit.

4. The method of claim 1, wherein the one-time programmable circuit comprises at least one fuse, at least one antifuse, or a combination of at least one fuse and at least one antifuse.

5. The method of claim 2 further comprising:

asserting an additional signal to indicate that the user can add the integrated circuit to an inventory after the one-time programmable circuit has been programmed using the control circuit; and displaying a message that indicates that the user can add the integrated circuit to the inventory in response to the additional signal.

6. The method of claim 1, wherein the one-time programmable circuit is not programmed when a manufacturer of the integrated circuit powers up the integrated circuit into a test mode.

7. The method of claim 2, wherein the integrated circuit is a programmable integrated circuit comprising programmable logic circuits.

8. The method of claim 7 further comprising:

allowing the integrated circuit to enter a configuration mode to configure the programmable logic circuits after the control circuit confirms that the one-time programmable circuit has been programmed.

9. A method for preparing an integrated circuit with access control for delivery to a user, the method comprising:

providing a one-time programmable circuit in the integrated circuit; and providing a control circuit in the integrated circuit that determines if the one-time programmable circuit is programmed in response to an attempt to access a mode of the integrated circuit after the integrated circuit is powered up and that generates a signal to indicate to the user of the integrated circuit that the mode has been previously accessed if the control circuit determines that the one-time programmable circuit has been programmed to indicate a previous access to the mode, wherein providing the control circuit in the integrated circuit further comprises providing the control circuit that causes the one-time programmable circuit to be programmed if the control circuit determines that the one-time programmable circuit has not been programmed, providing the control circuit that asserts an additional signal to indicate that the user can add the integrated circuit to an inventory after the one-time programmable circuit has been programmed, and providing the control circuit that displays a message that indicates that the user can add the integrated circuit to the inventory in response to the additional signal.

10. The method of claim 9, wherein the integrated circuit is a programmable integrated circuit comprising programmable logic circuits.

11. The method of claim 9, wherein the mode is one of a configuration mode of the integrated circuit, a test mode of the integrated circuit, or a user mode of the integrated circuit.

12. The method of claim 9, wherein the one-time programmable circuit comprises at least one fuse, at least one antifuse, or a combination of at least one fuse and at least one antifuse.

13. The method of claim 10, wherein providing the control circuit in the integrated circuit further comprises providing the control circuit that allows the integrated circuit to enter a configuration mode to configure the programmable logic circuits after the control circuit confirms that the one-time programmable circuit has been programmed.

14. The method of claim 9, wherein providing the control circuit in the integrated circuit further comprises providing the control circuit that prevents the integrated circuit from entering the mode if the user chooses not to program the one-time programmable circuit.

15. The method of claim 9, wherein the one-time programmable circuit is not programmed when a manufacturer of the integrated circuit powers up the integrated circuit into a test mode.

16. An integrated circuit comprising:

a control circuit; and a one-time programmable circuit, wherein the control circuit determines if the one-time programmable circuit is programmed in response to an attempt to access a mode of the integrated circuit after the integrated circuit powers up, wherein the control circuit generates a signal to indicate to a user of the integrated circuit that the mode of the integrated circuit has been previously accessed if the control circuit determines that the one-time programmable circuit has been programmed to indicate a previous access to the mode of the integrated circuit, and wherein the control circuit prevents the integrated circuit from entering the mode if the user chooses not to program the one-time programmable circuit.

17. The integrated circuit of claim 16, wherein the control circuit causes the one-time programmable circuit to be programmed if the control circuit determines that the one-time programmable circuit has not been programmed and if the user chooses an option to program the one-time programmable circuit.

18. The integrated circuit of claim 16, wherein the mode of the integrated circuit is one of a configuration mode of the integrated circuit, a test mode of the integrated circuit, or a user mode of the integrated circuit.

19. The integrated circuit of claim 16, wherein the one-time programmable circuit comprises at least one fuse, at least one antifuse, or a combination of at least one fuse and at least one antifuse.

20. The integrated circuit of claim 17, wherein the control circuit asserts an additional signal to indicate that the user can add the integrated circuit to an inventory after the one-time programmable circuit has been programmed using the control circuit, and displays a message that indicates that the user can add the integrated circuit to the inventory in response to the additional signal.

\* \* \* \* \*